United States Patent [19]
Belil Creixell

[11] Patent Number: 5,908,078
[45] Date of Patent: Jun. 1, 1999

[54] SUSPENSION/TRANSMISSION MECHANISM FOR MOTORCYCLES AND THE LIKE

[76] Inventor: Jose Luis Belil Creixell, c/homer, 40, E-08023 Barcelona, Spain

[21] Appl. No.: 08/170,332

[22] PCT Filed: Apr. 30, 1993

[86] PCT No.: PCT/ES93/00037

§ 371 Date: May 24, 1994

§ 102(e) Date: May 24, 1994

[87] PCT Pub. No.: WO93/22188

PCT Pub. Date: Nov. 11, 1993

[30] Foreign Application Priority Data

| May 4, 1992 | [ES] | Spain | 9200916 |
| May 29, 1992 | [ES] | Spain | 9201279 |
| Jun. 3, 1992 | [ES] | Spain | 9201292 |
| Jun. 26, 1992 | [ES] | Spain | 9201453 |
| Mar. 30, 1993 | [ES] | Spain | 9300641 |

[51] Int. Cl.[6] .............................. B62K 11/00; B62M 7/00
[52] U.S. Cl. .......................... 180/219; 280/277; 280/285
[58] Field of Search .......................... 180/219; 280/284, 280/276, 275, 283, 277, 285

[56] References Cited

U.S. PATENT DOCUMENTS

| 5,014,808 | 5/1991 | Savard et al. | 180/219 |
| 5,050,699 | 9/1991 | Savard | 180/219 |
| 5,060,749 | 10/1991 | Horiike et al. | 180/219 |
| 5,323,869 | 6/1994 | Kurayoshi et al. | 180/219 |

FOREIGN PATENT DOCUMENTS

| 0279763 | 8/1988 | European Pat. Off. . |
| 0049889 | 10/1938 | France . |
| 2405858 | 10/1977 | France . |
| 2419210 | 12/1978 | France . |
| 2547264 | 6/1983 | France . |
| 0007430 | 3/1913 | United Kingdom . |
| 0228682 | 12/1923 | United Kingdom . |
| 0260474 | 11/1926 | United Kingdom . |

*Primary Examiner*—J J Swann
*Attorney, Agent, or Firm*—Steinberg & Raskin, P.C.

[57] ABSTRACT

The mechanism comprises a swinging arm (1) which pivots at one end on a wheel (2) and at the other end on the frame of the vehicle, and comprises a power pinion (20) and a driven pinion (21) on the shaft of the drive wheel joined together by a chain.

It is characterized in that the swinging arm (1) is arranged parallel to the "antisquat" direction which is defined by the distance between the axes (8,10) of the wheels (2,4) and the center of gravity of the vehicle.

The branches (28,29) of the chain (22) are parallel to the swinging arm (1).

The effects of the drive wheel (2) and the chain (22) on the swinging arm (1), which tend to open and close it, are reduced.

19 Claims, 11 Drawing Sheets

SUSPENSION/TRANSMISSION MECHANISM FOR MOTORCYCLES AND THE LIKE

The present invention relates to a suspension/transmission mechanism for motorcycles and the like, comprising at least one swinging arm which pivots at one end on one or both sides of at Least one of the wheels and at the other end on the frame of the vehicle, and comprising a power or drive shaft output pinion and a driven pinion or crown gear on the shaft of the drive wheel joined together by at least one chain or the like.

BACKGROUND OF THE INVENTION

In vehicles which use a suspension/transmission mechanism of the type described, the combined action of the force of the chain and the contact force due to traction can produce reaction forces on the swinging arm which are the cause of considerable instabilities in the vehicle.

The basic design of the chain transmission geometry of conventional motorcycles is suitable for avoiding the lifting or sinking of the rear end during acceleration or deceleration while the traction wheel is fully gripping the ground.

Nevertheless, when the traction wheel loses or recovers its grip with the ground an abrupt change in the equilibrium of forces is produced giving rise to considerable reaction forces on the swinging arm which cause instabilities in the motorcycle such as the phenomena known as "pitching" and "high sider".

Independently of the type of motorcycle suspension/transmission system, the resultant force on the drive wheel at the point of contact with the ground, due to acceleration and in the absence of slipping (the forces due to weight being eliminated), is in a direction known as "antisquat" which is defined by the wheelbase of the motorcycle and the height of the center of gravity.

The effect of any force applied to a wheel which can rotate freely is transferred to the support (in this case the swinging arm) via the pivot while the wheel accelerates.

If the traction wheel suddenly loses its grip with the ground, the contact force disappears and the wheel accelerates. Then only the force of the chain is transferred to the swinging arm via the wheel pivot.

This gives rise to a considerable opening moment of the swinging arm relative to the frame, an effect which is converted into a lifting of the rear end of the vehicle if it is in the vertical position, or an escape of the wheel if the motorcycle is in an inclined position.

If, after hard acceleration, the drive wheel completely and suddenly recovers its grip with the ground, without the force of the chain acting, the contact force reappears due to the rapid deceleration of the wheel.

Then only the contact force is transferred to the swinging arm via the wheel pivot. This force gives rise to a considerable closing moment of the swinging arm relative to the frame which is converted into a dropping of the rear end of the vehicle.

Assuming that the force of the chain is approximately constant while the vehicle accelerates, after the first wheel slip a complex phenomenon of self-sustaining oscillations of the system of forces appears, leading to an oscillation of the contact force intensity relative to its initial value.

This oscillation provokes an opening and closing phenomenon of the swinging arm which gives rise to the continuous instability of the vehicle while accelerating at the limit of its grip.

In fact, as the wheel begins to slip (increasing its angular velocity to a value above that corresponding to the velocity of the vehicle) the couple of the force of the chain becomes greater than that of the contact force of the wheel. Due to the first of the phenomena described above, this produces a tendency for the swinging arm to open which causes an increase in the contact force.

The increase in the contact force causes the drive wheel to decelerate (returning to the wheel velocity which corresponds to the velocity of the vehicle), giving rise to a couple of the contact force on the swinging arm which is greater than that of the force of the chain. Due to the second of the phenomena described above, this produces a tendency for the swinging arm to close, which causes the wheel to lose its grip with the ground and can thus cause it to slip again.

This phenomenon is known as "pitching" and occurs particularly in vehicles with a low weight-to-power ratio. Once it has started in the rear portion of the vehicle it is transmitted to the front suspension and can easily cause the vehicle to become totally unstable.

The instability stops when the rider releases the throttle, which is not convenient during a race.

In the case of a complete and sudden slip at the point at which the wheel is in contact with the ground (due to an oil patch, sand, humidity, painted lines etc.) the first of the two phenomena described gives rise to a violent opening of the swinging arm which tends to throw the rider upwards and forwards with a force comparable to his own weight. This tendency is absorbed to a large extent by the shock absorbers.

If this phenomenon occurs while the motorcycle is in an inclined position on a bend, it can give rise to more complex and more dangerous situations.

In fact, the opening of the swinging arm due to abrupt slipping causes an over-inclination which (often followed by a throttle release) causes the drive wheel to find its grip again. Then the swinging arm closes relative to the frame while the motorcycle moves in the opposite direction and returns to the vertical position. A subsequent reaction force throws the rider upwards.

This phenomenon is known as "high sider" and can cause very dangerous falls.

These phenomena are due on one hand to the arrangement of the swinging arm relative to the frame where the forces which act on the drive wheel are transmitted to the swinging arm, and on the other hand to the direction of the chain which also acts on the swinging arm.

In order to minimize the effects of the drive wheel and the chain on the swinging arm various solutions have been sought based either on controlling the accelerations and decelerations, such that they are effected gradually, or in damping the movements of the swinging arm.

Nevertheless, none of the solutions adopted proposes a new arrangement of the swinging arm relative to the frame, i.e. a design which enables the effects of the drive wheel movements on the swinging arm to be substantially reduced, nor a chain arrangement which minimizes its effects.

DESCRIPTION OF THE INVENTION

The drawbacks described are solved by means of the mechanism of the invention.

The suspension/transmission mechanism for motor-cycles and the like which forms the object of the present invention is characterized in that for at least one of the wheels the virtual line which joins the two pivot points of the swinging arm is substantially parallel to a line which goes from the point of tangency of that wheel with the ground to a higher point defined by the intersection of a line which runs perpendicular to the ground from the point of tangency with the ground of the opposite wheel and a line which runs parallel to the ground at the height of the center of gravity (if the vehicle and rider assembly in a position of positive or negative acceleration.

By means of the arrangement of the swinging arm in the "antisquat" direction the effects of the drive wheel on the swinging arm, which tend to close it during a complete and sudden recovery of the traction wheel grip, are reduced.

Thus, the mechanism can be applied to the rear wheel, the front wheel or to both wheels simultaneously, reducing the negative effects described which appear particularly during abrupt acceleration and braking. In particular, the effect of abrupt braking is reduced if the mechanism is applied to the front wheel; similarly, the effect of abrupt acceleration is reduced if applied to the rear wheel.

According to one embodiment, the mechanism of the invention comprises, between the power or drive shaft output pinion and the driven pinion or crown gear of the drive wheel, a complementary transfer pinion and a guide pinion or pulley which is rotationally mounted at the high pivot point of the swinging arm and which has a diameter that is substantially equal to that of the crown gear which forms an integral part of the rear wheel, thereby maintaining the two input and output branches of the transmission chain, belt or the like, which act on the driven pinion of the rear wheel, substantially parallel to each other and to the swinging arm.

In this way the reaction forces of the chain on the swinging arm, which tend to open it during complete and sudden slipping of the drive wheel, are reduced.

The branches of the chain can be arranged parallel to each other with various types of transmission.

According to another embodiment, the mechanism of the invention comprises, between the pivot axis where the swinging arm joins the frame of the vehicle and the axis of the power or drive output pinion, a first transmission chain, belt or the like which engages the pinion with a first crown gear or pulley which is coaxial with the axis of the swinging arm, and a second chain or belt which transmits the power from the axis of the swinging arm to the axis of the drive wheel via two more crown gears or pulleys, preferably of the same diameter and mounted on the corresponding axes.

In this embodiment the transfer pinions are eliminated, thereby reducing the changes in the tension of the chain.

According to another embodiment, the mechanism of the invention comprises, between the power pinion and the driven pinion or crown gear of the drive wheel, a guide pinion or pulley which is rotationally mounted at a point on the frame of the vehicle above the pivot axis of the swinging arm on the frame, and a complementary transfer pinion arranged on the transmission itself between the drive wheel and the power pinion, this second transfer pinion being rotationally mounted at a point on the frame of the vehicle below the pivot axis of the swinging arm on the frame, such that between them they keep the two input and output branches of the transmission chain, belt or the like, which act on the driven pinion or crown gear of the rear wheel, substantially parallel to each other and to the swinging arm, the branches being substantially parallel to the diagonal which goes from the point of tangency of the drive wheel with the ground to a higher point defined by the intersection of the virtual axis which runs perpendicular to the ground through the axis of the front wheel and the virtual axis which runs parallel to the ground through the center of gravity of the vehicle and rider assembly in a position of maximum acceleration.

In this embodiment a reduced friction with a single chain is achieved.

Another characteristic of the invention is that the pivot point of at least one of the swinging arms on the frame is situated close to the center of gravity of the vehicle and rider assembly in a position of positive or negative acceleration, at a distance from the center of gravity which is less than the maximum dimension of the crankcase.

In this way the moments which act on the axis of the swinging arm or arms, as the axis moves above or below its optimum working position, are neutralized as much as possible during both maximum acceleration and maximum braking.

Another characteristic of the invention is that it comprises an intermediate piece arranged between the swinging arm and the frame of the motorcycle, the intermediate piece pivoting about the high pivot point of the swinging arm and sliding relative to the frame of the motorcycle in the "antisquat" direction, elastic means being provided between the frame and the intermediate piece.

Since the swinging arm is joined to the frame by means of an intermediate piece, and since elastic means are provided between these two parts, the effect of the jolts produced by the abrupt accelerations and decelerations of the rear wheel is damped. In this way the riding conditions of the motorcycle are improved.

According to another embodiment, the transfer pinion is mounted on a support which pivots about said high pivot point of the swinging arm.

In this way, as the swinging arm moves the transfer pinion can always be arranged in the optimum engagement position, i.e. with its axis always at the same distance from the axis of the guide pinion or pulley.

Advantageously, the suspension/transmission system of the invention comprises elastic means provided between the frame and the support of the transfer pinion.

Said elastic means, for example a spring, compensate the tension of the chain and keep the transfer pinion support in an appreciably stable position.

According to one embodiment the intermediate piece comprises at least one axis which slides within a corresponding housing provided in the frame of the motorcycle, for example a pair of grooved axes which can slide within complementary grooved housings.

According to another embodiment, the intermediate piece comprises at least one housing inside which slides the corresponding axis that forms an integral part of the frame. It can consist, for example, of a grooved housing along which slides the grooved end of the frame.

Advantageously, the suspension/transmission system comprises elastic means arranged between the intermediate piece and the transfer pinion support.

According to another embodiment, the intermediate piece is coupled to the fuel tank of the vehicle. This simplifies the structure of the motorcycle.

Also advantageously, the suspension/transmission mechanism comprises three basic structures which pivot about a common point corresponding to the pivot point of at least one of the swinging arms on the frame, a non suspended structure formed by the elements supported directly by at least one of the wheels, a first suspended structure which supports the engine, and a second suspended structure which constitutes the rider's grip support, such as handlebars, footpegs or seat, and, in one case, support elements for the other wheel.

In this way the effects of abrupt acceleration and deceleration on the rider are minimized.

The suspension/transmission mechanism also comprises elastic means arranged between the different structures described and, in one case, between the two swinging arms of both wheels. Thus, the oscillations of the wheel or wheels are transmitted first to the first suspended structure which supports the engine, reducing the effect upon the second suspended structure where the rider is placed. In the case of swinging arms on both of the wheels the oscillation can be transmitted from one swinging arm to the other.

According to a preferred embodiment, the engine is mounted in such a way that the crankcase is arranged above the cylinder.

This arrangement of the cylinder relative to the crankcase leaves more free space in the lower part of the motorcycle, enabling it to be inclined further when going around a bend and simultaneously lowering the center of gravity.

The cylinder can be arranged in front of the carburetor, relative to the direction of travel of the vehicle, but it may also be arranged behind to make it easier to connect the exhaust and intake pipes.

Also advantageously, the engine is mounted in such a way that the power pinion is arranged close to the pivot point of at least one of the swinging arms on the frame at a distance which is less than the maximum dimension of the crankcase.

In this way the power pinion is brought as close as possible to the pivot axis of the swinging arms, increasing the transmission performance and even making possible the direct transmission from the power pinion to the crown gear (whose diameter is substantially the same) of the drive wheel axis.

According to another embodiment, the brake disc is mounted directly onto the axis of the transfer pinion situated between the power or drive output pinion and the crown gear which forms an integral part of the drive wheel.

BRIEF DESCRIPTION OF THE DRAWINGS

In order that the characteristics of the present invention be better understood, the accompanying drawings show by way of a non-limiting example one practical embodiment thereof.

In the drawings.

DESCRIPTION OF THE PREFERRED EMBODIMENTS

Figure 2:
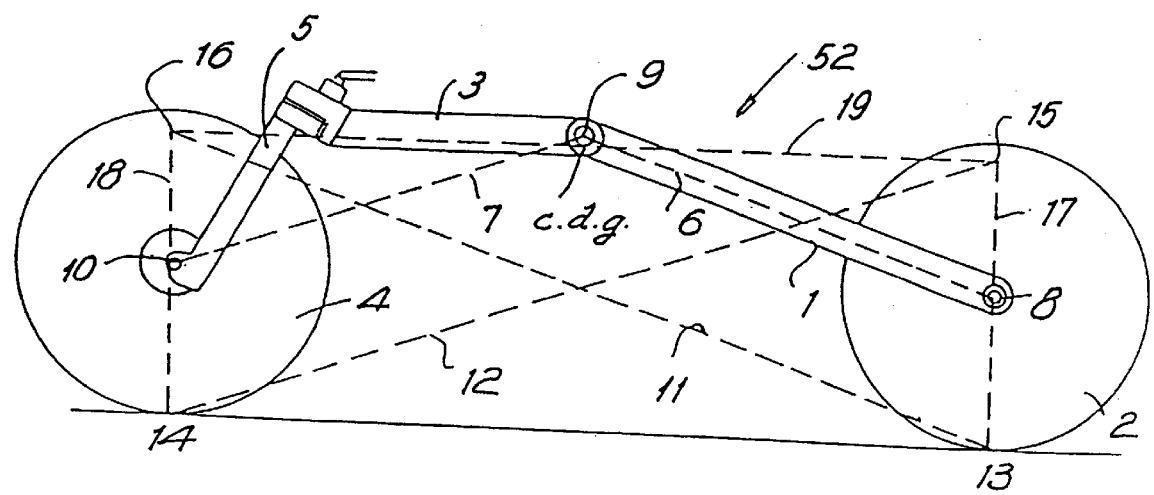
FIG. 2 shows in side elevation a non suspended structure of the motorcycle of the invention shown in FIG. 12, where the arrangement of the swinging arms can be seen.

As can be seen in FIG. 2 for greater clarity, the suspension mechanism for motorcycles and the like which forms the object of the present invention comprises a swinging arm 1 which pivots at one end about the rear wheel 2 and a swinging arm 3 which pivots about the front wheel 4 via the steering fork 5.

For both the front wheel 4 and the rear wheel 2 the virtual line 6,7 which joins the two pivot points 8,9;9,10 of the swinging arm is parallel to a line 11,12 which goes from the point of tangency 13,14 of the wheel 2,4 with the ground to a high point 15,16 defined by the intersection of a line 17,18 which runs perpendicular to the ground through the point of tangency 13,14 with the ground of the opposite wheel and a line 19 which runs parallel to the ground at the height of the center of gravity (c.o.g.) of the vehicle and rider assembly in a position of positive or negative acceleration.

Figure 6:
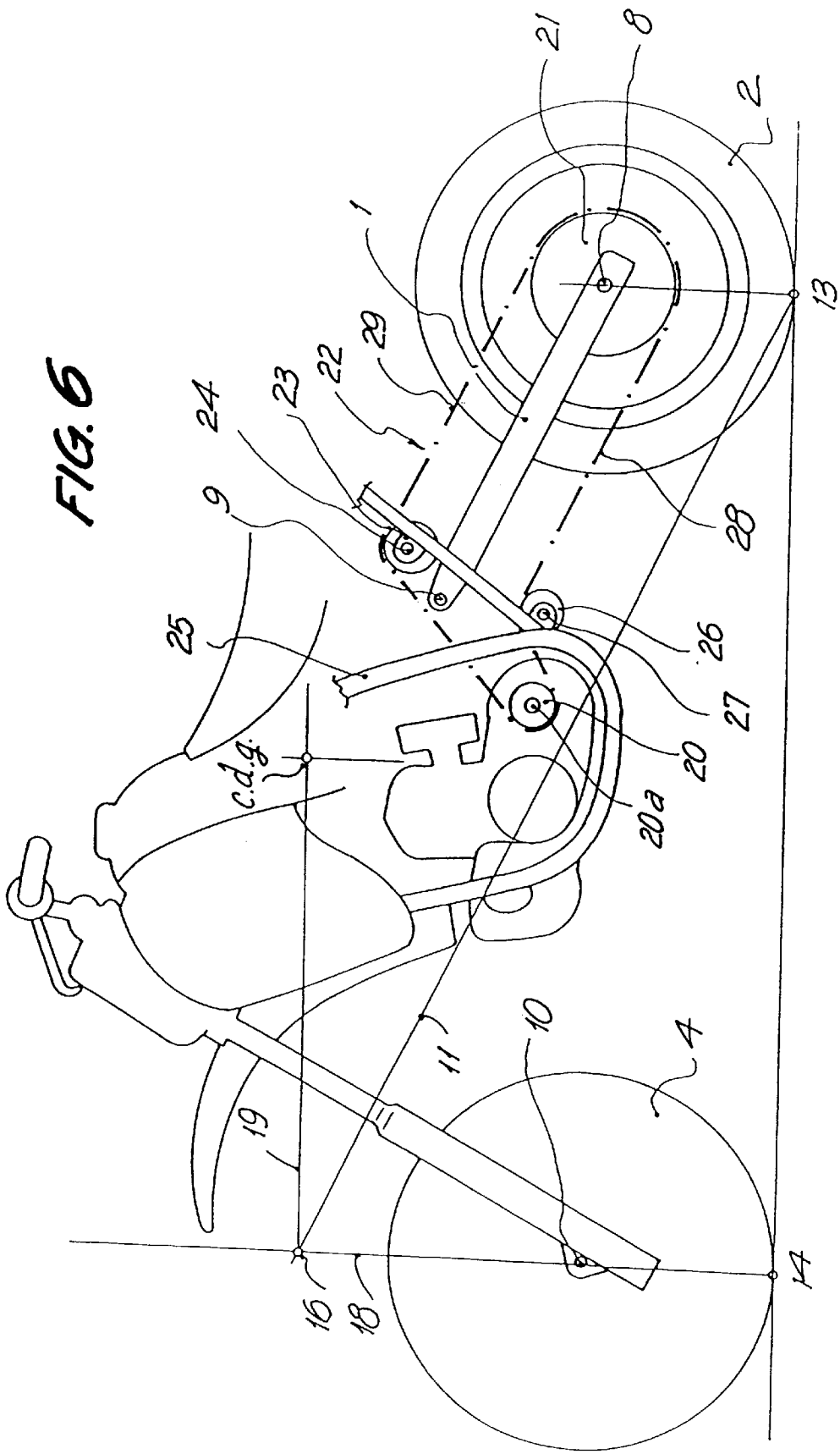

FIG. 6 shows a motorcycle whose swinging arm 1 fulfils the above conditions and comprises a power pinion 20 (or engine drive shaft 20a output pinion), and a driven pinion or crown gear 21 on the axis of the drive wheel, joined by a chain 22.

It also comprises, between the power pinion 20 and the driven pinion or crown gear 21, a guide pinion or pulley 23 which is rotationally mounted at a point 24 on the frame 25 of the vehicle above the pivot axis 9 of the swinging arm 1 on the frame, and a complementary transfer pinion 26 arranged in the transmission itself, between the drive wheel 2 and the power pinion 20.

This second transfer pinion 26 is rotationally mounted at a point 27 on the frame below the pivot axis 9 of the swinging arm such that between them they keep the two input 28 and output 29 branches of the chain 22 substantially parallel to each other and to the swinging arm.

As can be seen the branches 28,29 are substantially parallel to the line 11 which goes from the point of tangency 13 of the drive wheel with the ground to high point 16 defined by the intersection of the virtual axis 18 which runs perpendicular to the ground through the axis 10 of the front wheel 4 and the virtual axis 19 which runs parallel to the ground through the center of gravity (c.o.g.) of the vehicle and rider assembly in a position of maximum acceleration.

Figure 1:
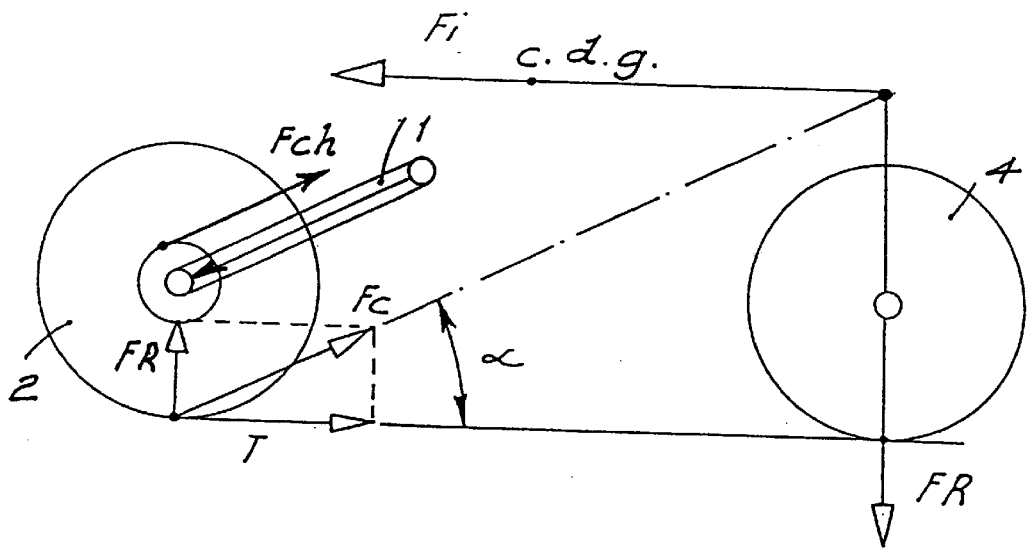
FIG. 1 shows schematically the forces which act in the mechanism of the invention.

The forces which act in the mechanism of the invention are represented in FIG. 1. The figure shows a rear drive wheel 2 and a front wheel 4.

The contact force Fc is the resultant of the force FR due to mass transfer and the traction force T, and acts in the "antisquat" direction defined above.

Since the swinging arm 1 is arranged in the "antisquat" direction, the couple which tends to close the winging arm during a complete and sudden recovery of traction wheel grip is eliminated.

By means of the arrangement of the chain, the force Fch exerted by the chain does not produce a couple tending to open the swinging arm during a complete and sudden slipping of the drive wheel.

The embodiments shown in FIGS. 3, 4, 5 and 7 also fulfil the same conditions of the swinging arm or arms and of the chain, but have further particular characteristics.

Figure 3:
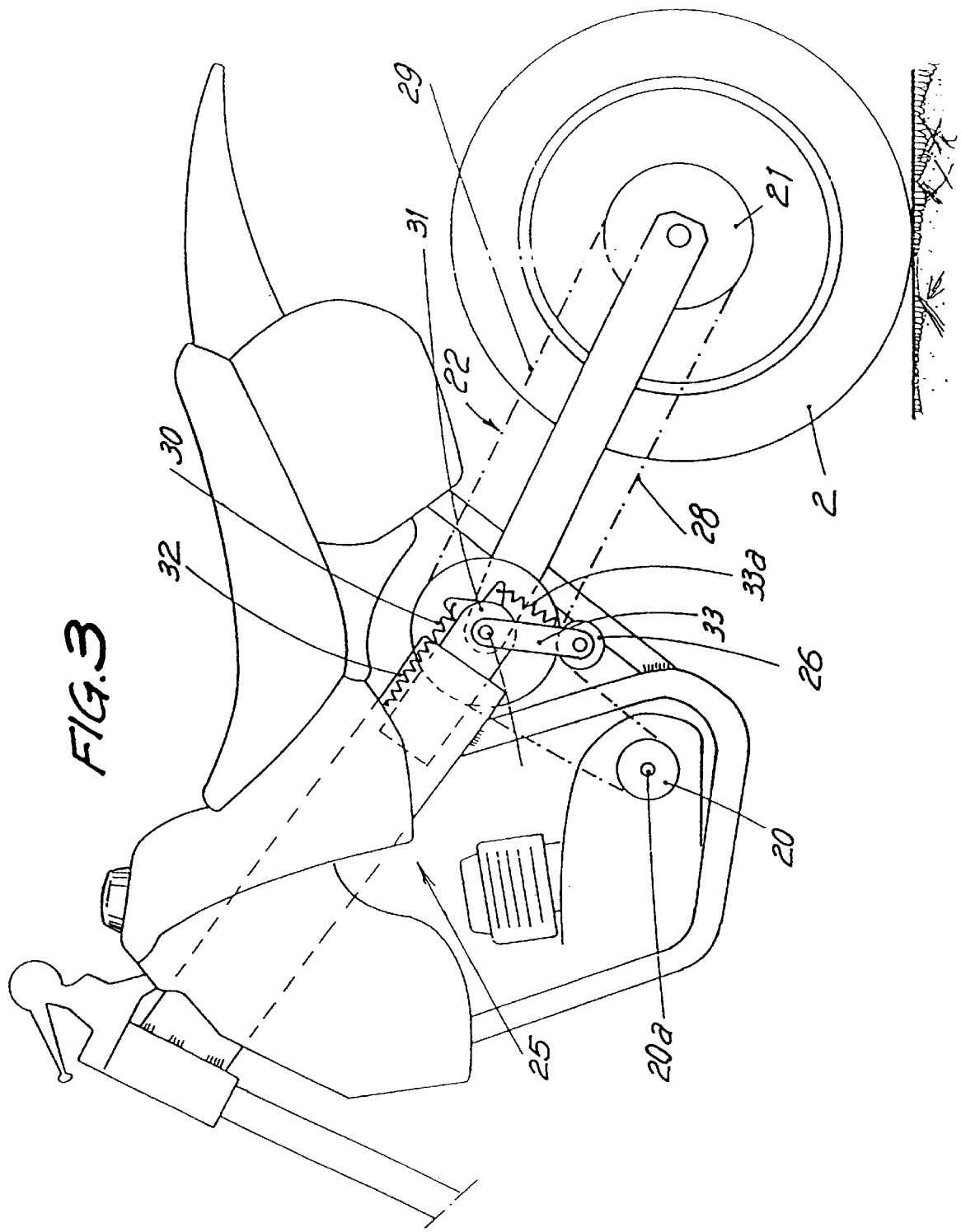
FIG. 3 is a side elevation view of a motorcycle provided with an intermediated piece between the swinging arm and the frame.

The embodiment shown in FIG. 3 comprises, between the power pinion 20 and the driven pinion or crown gear 21, a complementary transfer pinion 26 and a guide pinion or pulley 30 which is rotationally mounted at the high pivot point 9 of the swinging arm and which has a diameter that is substantially equal to that of the crown gear 21 which forms an integral part of the rear wheel 2, thereby maintaining the two input and output branches 28,29 of the chain 22, which act on the driven pinion 21 of the rear wheel 2, substantially parallel to each other and to the swinging arm 1.

This embodiment also comprises an intermediate piece 31 arranged between the swinging arm 1 and the frame 25 of the motorcycle. This intermediate piece 31 pivots about the high pivot point 9 of the swinging arm 1 and slides relative to the frame 25 of the motorcycle in the "antisquat" direction. Elastic means 32 are provided between the frame 25 and the intermediate piece 31. The transfer pinion 26 is mounted on a pivoting support 33 joined to the intermediate piece with elastic means 33a.

Figure 4:
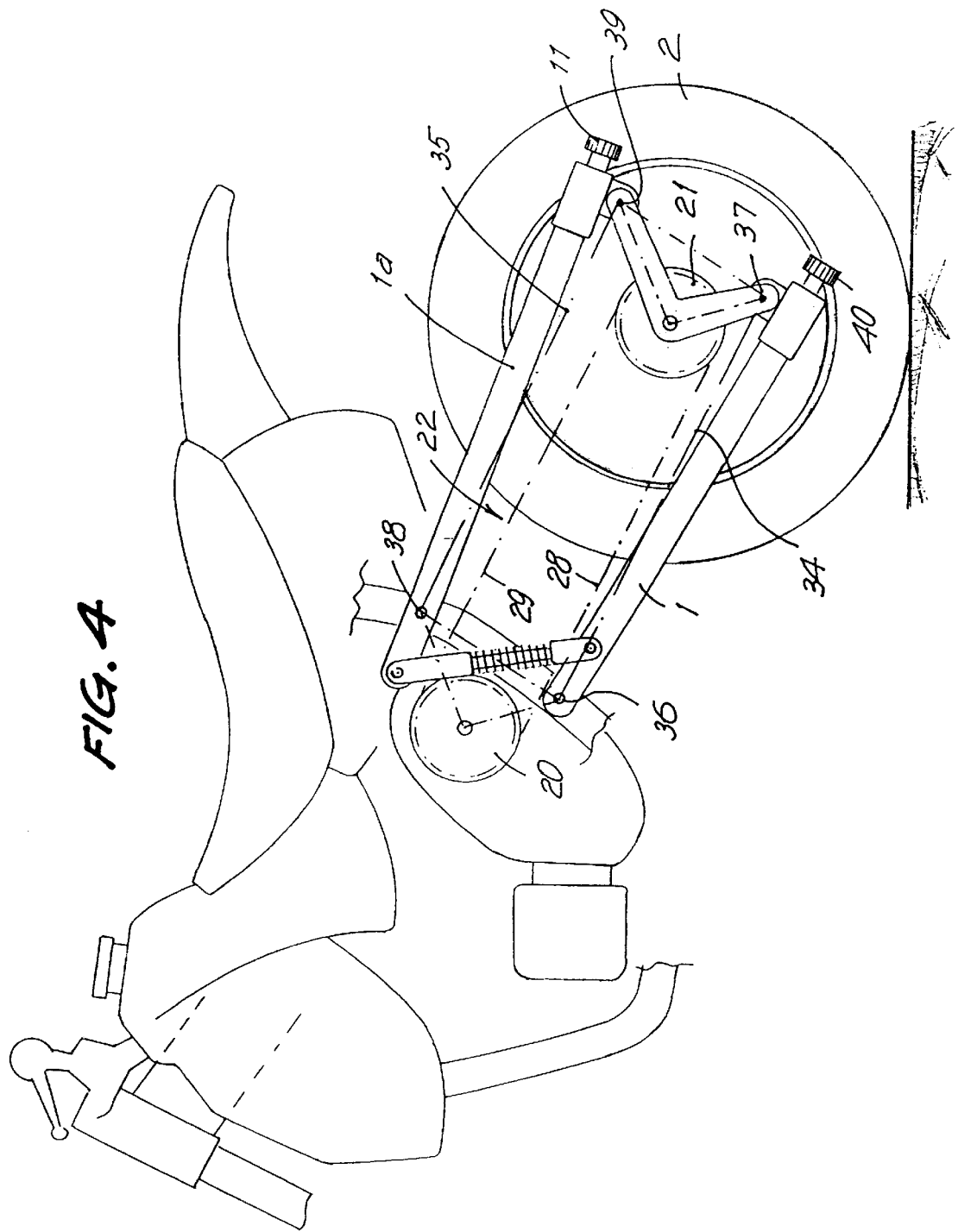
FIGS. 4 to 7 show in side elevation various embodiments of the invention with different types of swinging arm and transmission chain.

FIG. 4 shows an embodiment which meets the same conditions of the invention, but which has two swinging arms 1,1a of the type described in the Spanish addition certificate 8703028. In this case it is the virtual lines 34,35 joining the pivot points 36,37 and 38,39 which are substantially parallel to the "antisquat" direction and to the branches 28,29 of the chain 22. This embodiment has the additional advantage that it is provided with means 40,41 of regulating the length of the swinging arms 1,1a in order to adjust the tension in the chain.

Figure 5:
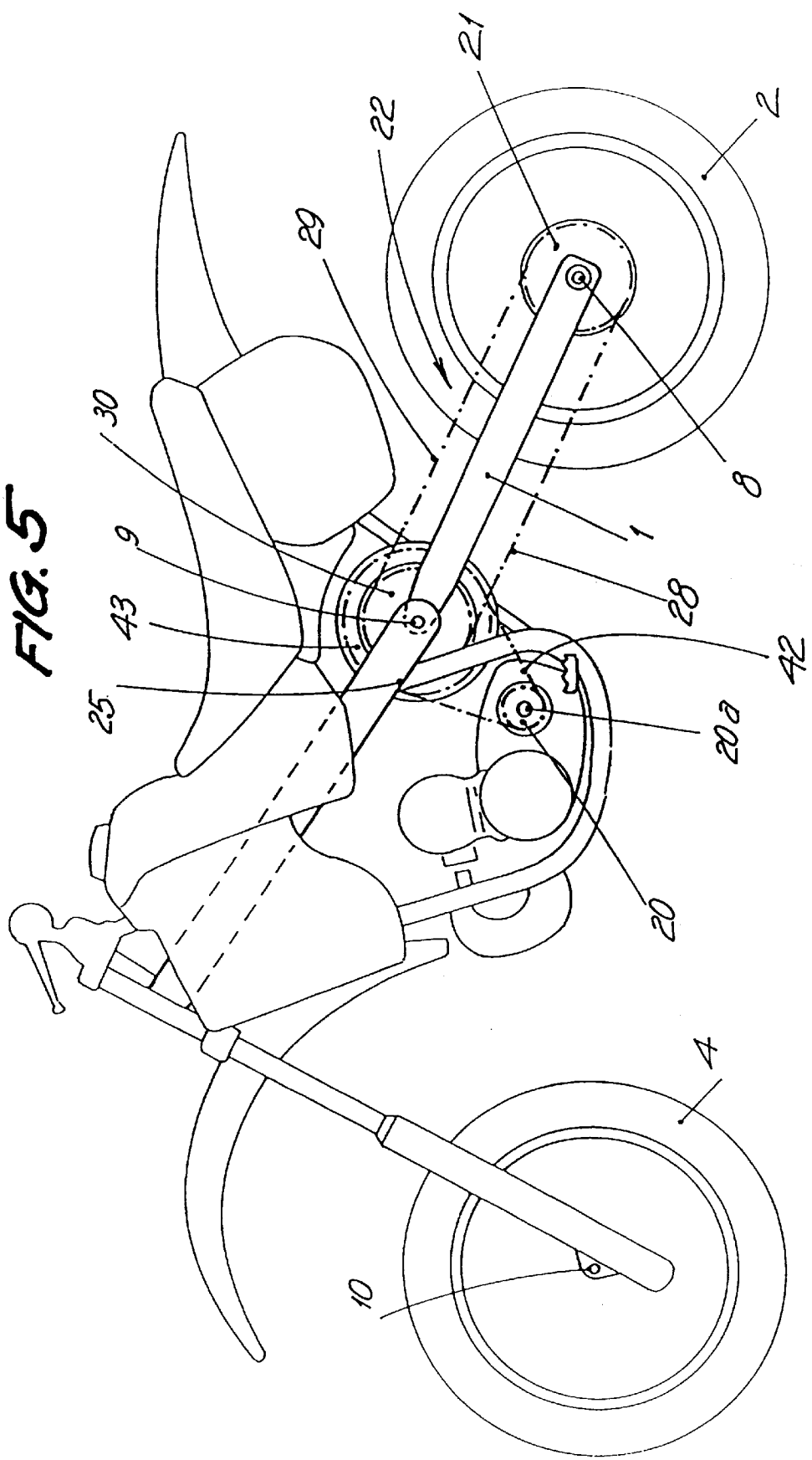

FIG. 5 shows an embodiment which comprises, between the pivot axis 9 of the swinging arm 1 on the frame 25 of the vehicle and the axis 20a of the power pinion 20, a first chain 42 which engages said pinion 20 with a first crown gear 43 which is coaxial with the axis 9 of the swinging arm 1, and a second chain 22 which transmits the power from the axis 9 of the swinging arm 1 to the axis 8 of the drive wheel 2 via two more crown gears 21,30 of the same diameter.

Figure 7:
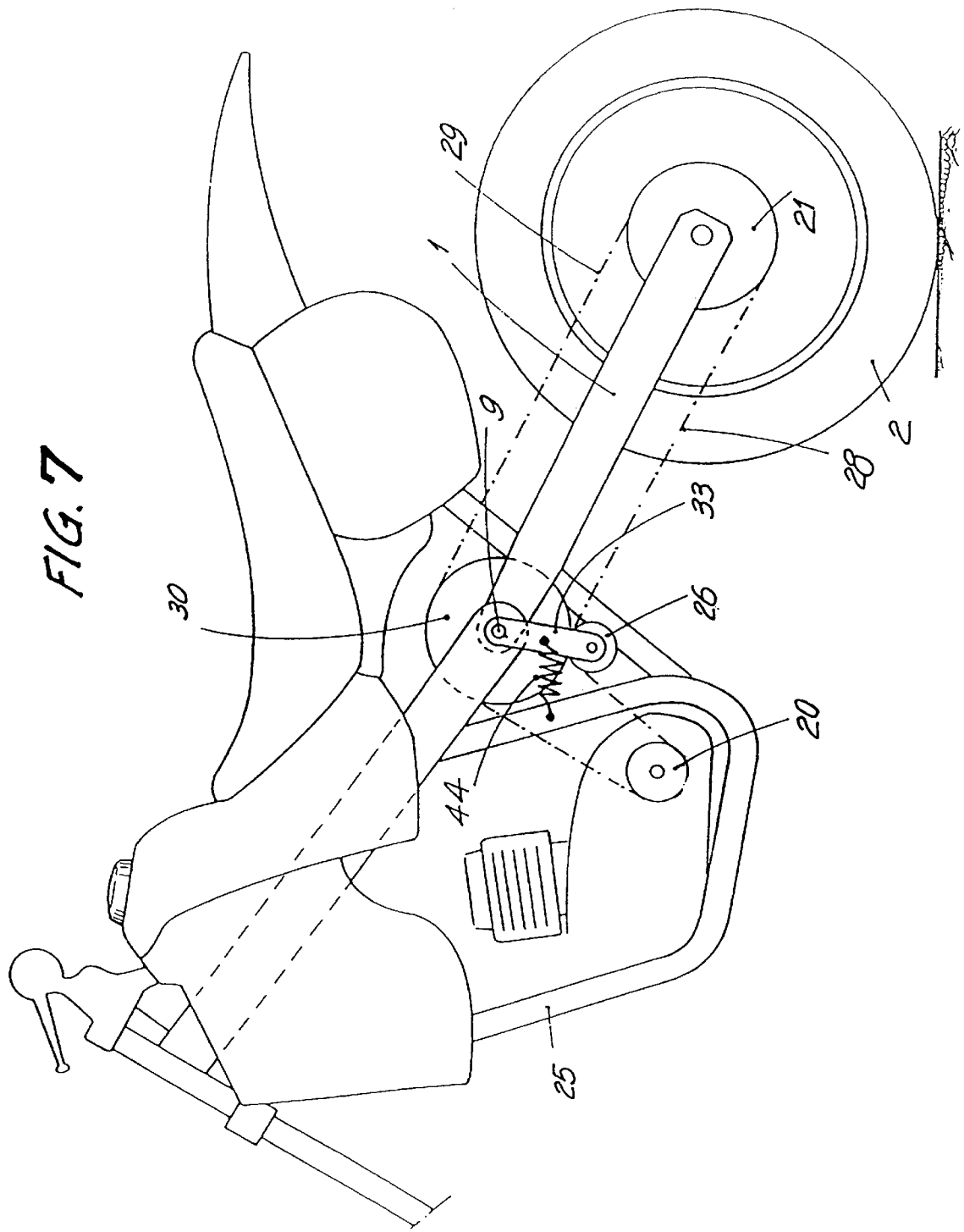

The embodiment shown in FIG. 7 has a swinging arm and a chain mechanism which are identical to those of FIG. 3. In this case the transfer pinion 26 is mounted on a support 33 which pivots about the high pivot point 9 of the swinging arm 1 without the intermediate piece 31. The support 33 is joined to the frame 25 with elastic means.

Figure 8:
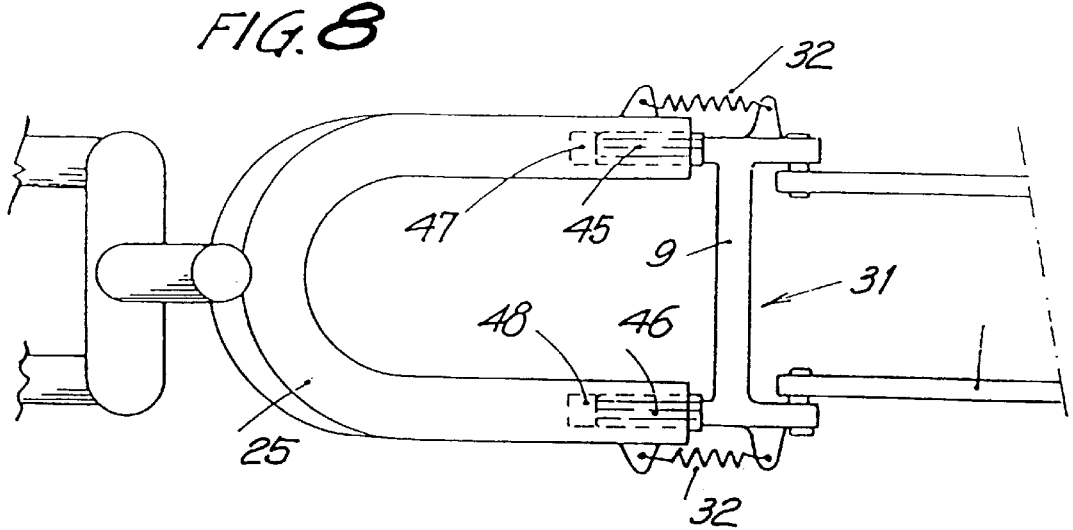
FIG. 8 is a plan view of the central part of a motorcycle showing an alternative embodiment of the intermediate piece where, for greater clarity, the transmission is not shown.

FIG. 8 shows an alternative embodiment of the intermediate piece 31 shown in FIG. 3. The intermediate piece 31 comprises a pair of axes 45,46 which slide within corresponding housings 47,48 provided in the frame 25 of the motorcycle. The elastic means 32 can also be seen in the figure.

Figure 9:
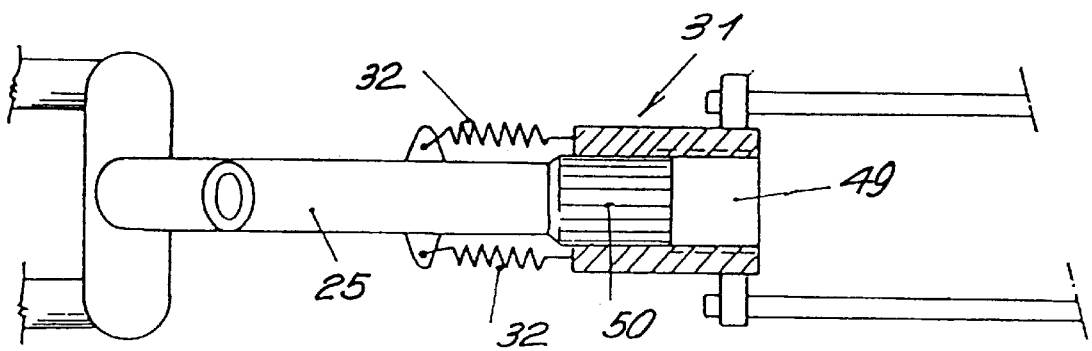
FIG. 9 is a plan view of the central part of a motorcycle showing another alternative embodiment of the intermediate piece where, for greater clarity, the transmission is not shown.
Figure 10:
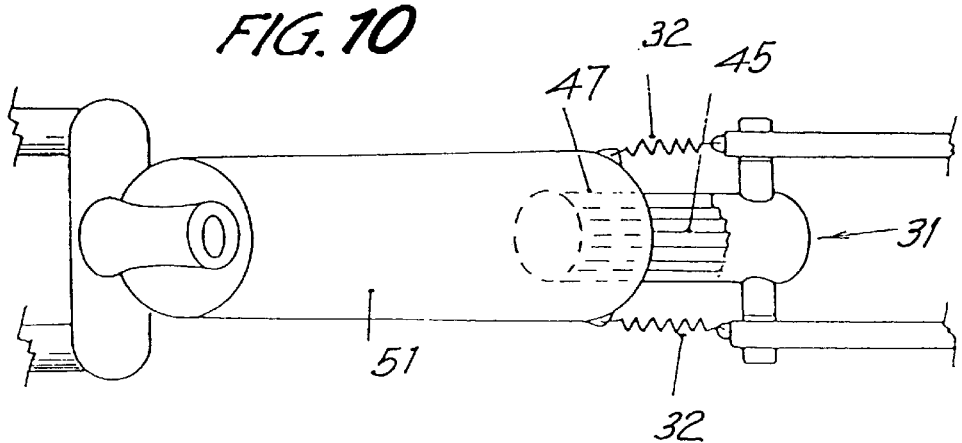
FIG. 10 is a plan view of the central part of a motorcycle showing another alternative embodiment of the intermediate piece where, for greater clarity, the transmission is not shown.

In the embodiment shown in FIG. 9 the intermediate piece 31 comprises at least one housing 49 inside which slides a corresponding axis 50 which forms an integral part of the frame 25 of the motorcycle In the embodiment shown in FIG. 10 the intermediate piece 31 is housed in the fuel tank 51 of the motorcycle and it slides therein.

Figure 12:
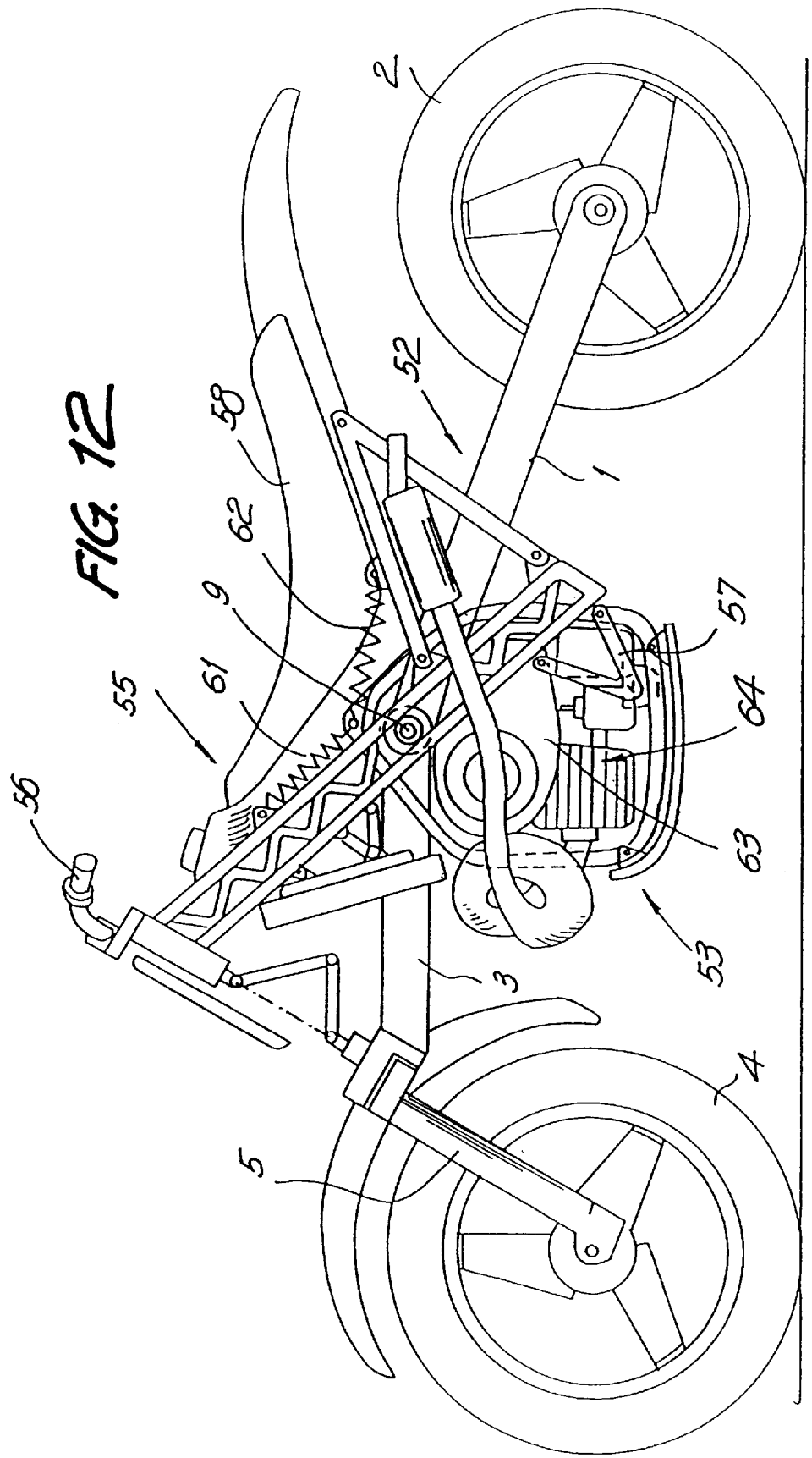
FIG. 12 is a side elevation view provided with the structures shown in FIGS. 2, 11 and 13.

FIG. 12 shows a motorcycle with the swinging arm arranged in a direction which is appreciably parallel to the "antisquat" direction.

As can be seen in FIG. 2, the center of gravity (c.o.g.) is situated very close to the pivot point 9 of the swinging arms 1,3. The distance between these two points is much less than the maximum dimension of the crankcase 63 (FIG. 12).

Figure 11:
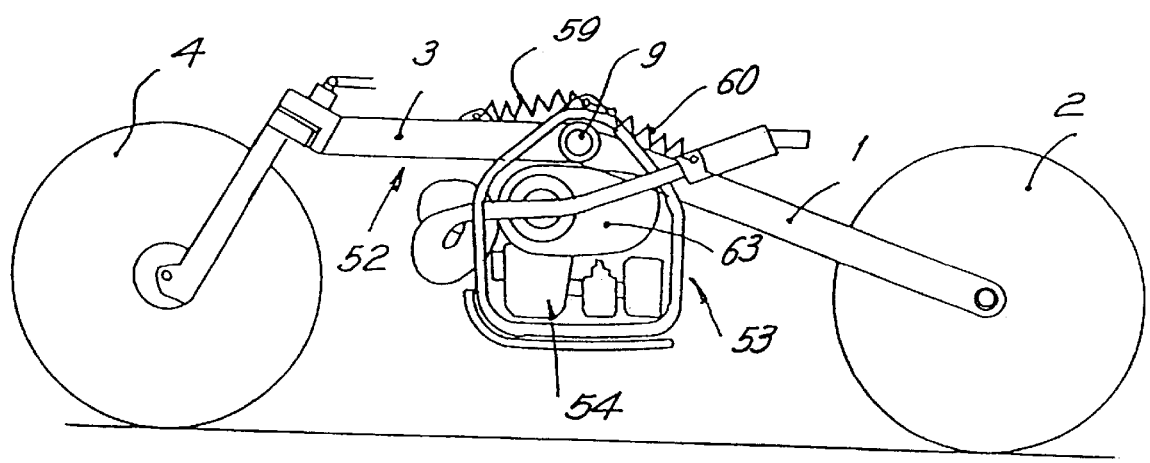
FIG. 11 shows a first suspended structure which supports the engine together with the non suspended structure shown in FIG. 2.
Figure 13:
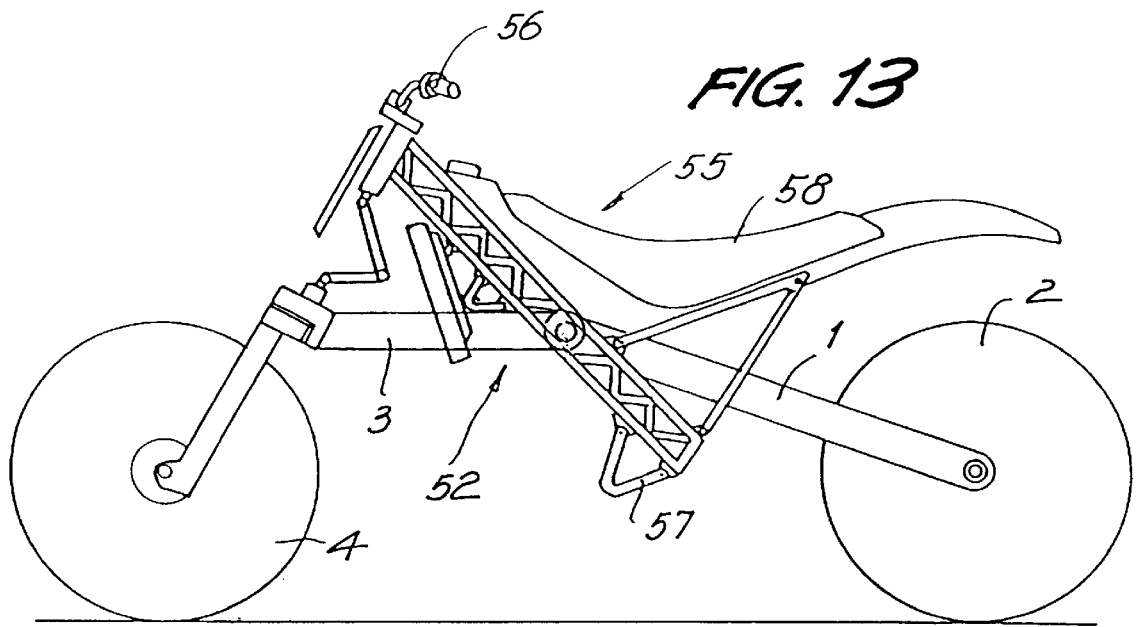
FIG. 13 shows a second suspended structure which constitutes the rider's grip support together with the non suspended structure shown in FIG. 2.

As the FIGS. 2, 11, 12 and 13 show, the motorcycle represented in FIG. 12 comprises three basic structures which pivot about a common point 9 corresponding to the pivot point of the swinging arms 1,3 on the frame:

- a non suspended structure 52, represented separately in FIG. 2, formed by the elements which are directly supported by the wheels 2,4,
- a first suspended structure 53, represented in FIG. 11 together with the non suspended structure 52, said suspended structure supporting the engine 54,
- and a second suspended structure 55, represented in FIG. 13 together with the non suspended structure 52, said suspended structure 55 constituting the rider's grip support, such as handlebars 56, footpegs 57 or seat 58.

The suspension mechanism also comprises elastic means 59,60 (FIG. 11) and 61,62 (FIG. 1) provided between the various structures.

Although for simplicity it has not been shown, the two swinging arms 1,3 may be arranged on either side of the motorcycle.

In the preferred embodiment shown in FIG. 12 the crankcase 63 is located above the cylinder 64. This arrangement of the cylinder relative to the crankcase leaves more free space in the lower part of the motorcycle, enabling it to be inclined further when going around a bend and lowering the center of gravity.

Figure 14:
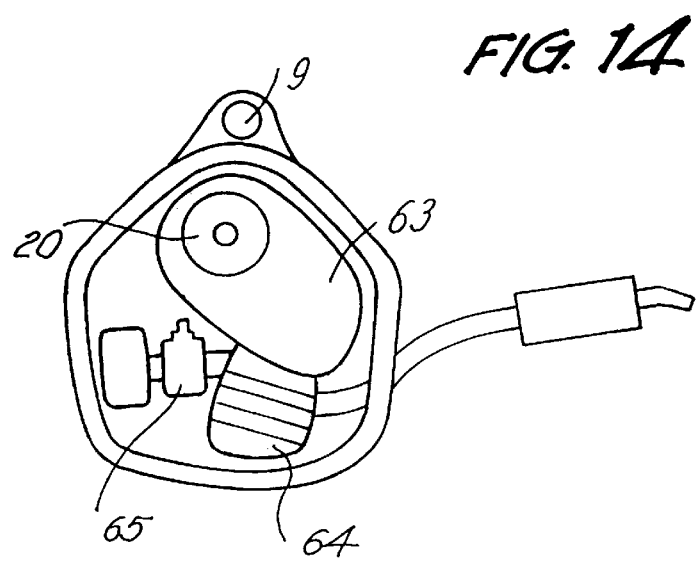
FIG. 14 shows in elevation an embodiment of the engine where the cylinder is arranged behind the carburettor to make it easier to connect the exhaust pipe.

According to another embodiment shown in FIG. 14, the cylinder 64 can be arranged behind the carburetor 65, relative to the direction of travel of the vehicle, to make it easier to connect the exhaust and intake pipes.

As said figure shows, the engine is mounted in such a way that the power pinion 20 is arranged close to the pivot point 9 of the winging arms 1,3 at a distance which is less than the maximum dimension of the crankcase 63.

Figure 15:
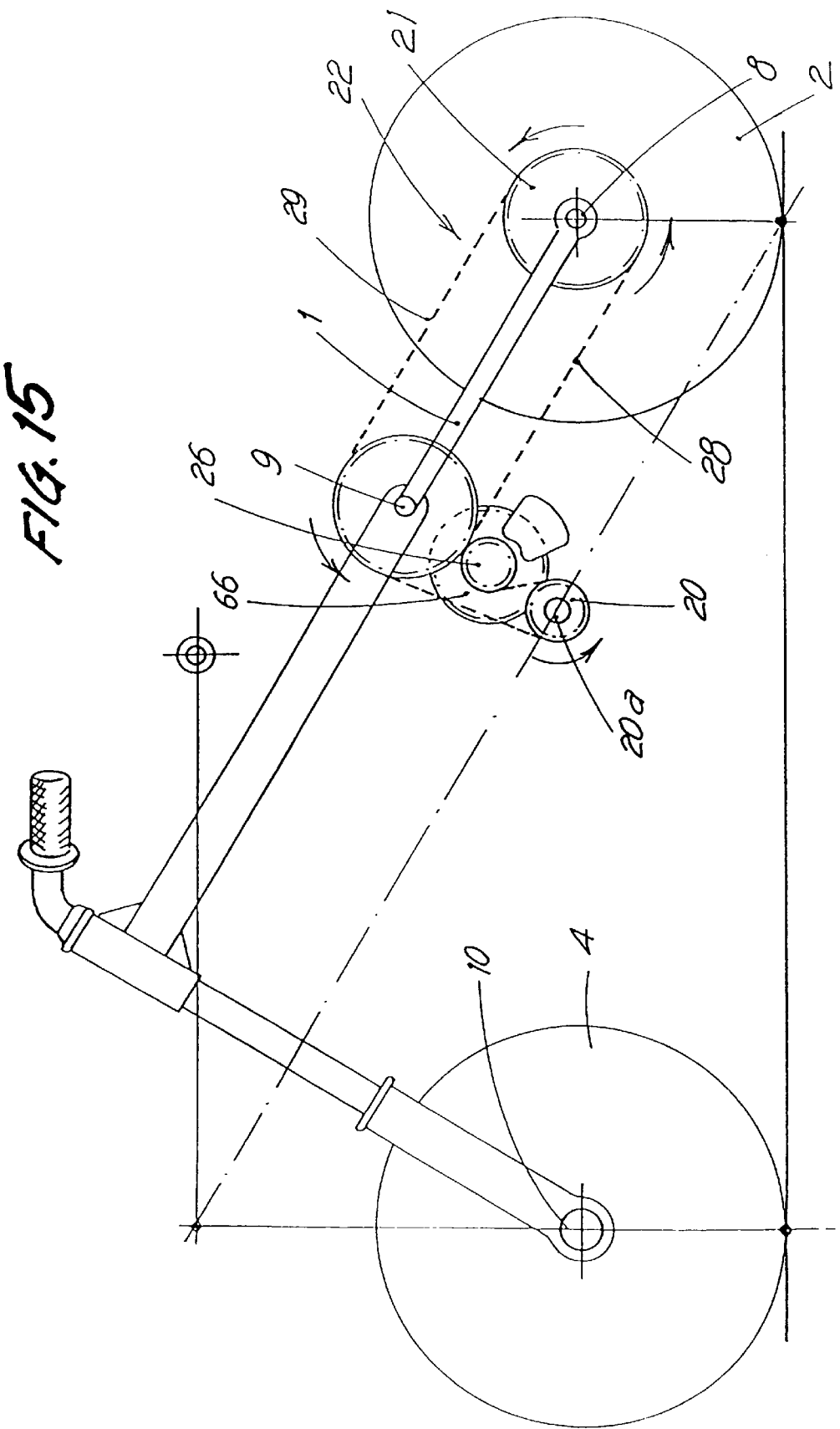
FIG. 15 is a side elevation view of an embodiment of the motorcycle with a particular brake disk arrangement.

FIG. 15 is a side elevation view of an embodiment of the motorcycle with a particular brake disk arrangement.

FIG. 15 shows an embodiment in which the brake disc 66 is mounted directly onto the axis of the transfer pinion 26 situated between the power or drive output pinion 20 and the crown gear 21 which forms an integral art of the drive wheel 2.

I claim:

1. A suspension/transmission mechanism for motorcycles and other vehicles having at least one wheel and a motor output, comprising a frame, at least one elongate swinging arm for coupling said at least one wheel to said frame, said at least one swinging arm being structured and arranged to pivot at a first pivot point at one end on at least one side of said at least one wheel and at a second pivot point at the other end on said frame, one of a power pinion and an engine drive shaft pinion coupled to the motor output, one of a driven pinion and a crown gear arranged on a shaft of said at least one wheel, at least one chain for motively coupling said one of said power pinion and said engine drive shaft pinion to said one of said driven pinion and said crown gear, said at least one swinging arm being arranged such that a virtual line joining said first and second pivot points is substantially parallel to a line extending from a point of tangency of said at least one wheel with the ground to a high point defined by the intersection of a line which runs perpendicular to the ground through the point of tangency with the ground of a wheel opposite said at least one wheel and a line extending substantially parallel to the ground at the height of the center of gravity of the vehicle and rider assembly in a position of positive and negative acceleration in a horizontal direction, a complementary transfer pinion arranged between said one of said power pinion and said engine drive shaft pinion and said one of said driven pinion and said crown gear, and a guide member arranged between said one of said power pinion and said engine drive shaft pinion and said one of said driven pinion and said crown gear and rotationally mounted at said second pivot point, said guide member having a diameter equal to a diameter of said one of said driven pinion and said crown gear, said at least one wheel being a rear wheel of the vehicle, said one of said driven pinion and said crown gear forming an integral part of said rear wheel, said at least one chain comprising a first chain for operatively connecting said one of said driven pinion and said crown gear and said guide member such that portions of said first chain between said one of said driven pinion and said crown gear and said guide member are substantially parallel to each other and to said at least one swinging arm.

2. The mechanism of claim 1, further comprising one of an additional crown gear and a pulley having a rotational axis coincident with said second pivot point, said guide member having a rotational axis coincident with said second pivot point and rotationally connected to said one of said additional crown gear and said pulley, said at least one chain further comprising a second chain for operatively connecting said one of said power pinion and said engine drive shaft pinion and said one of said additional crown gear and said pulley, said guide member and said one of said driven pinion and said crown gear having substantially the same diameter and substantially the same axis of rotation, said one of said power pinion and said engine drive shaft pinion transferring motive power to said one of said driven pinion and said crown gear on said at least one wheel via said first and second chains.

3. The mechanism of claim 1, wherein said guide member comprises one of a guide pinion and a pulley rotationally mounted at a first mounting point on said frame between said one of said power pinion and said engine drive shaft pinion and said one of said driven pinion and said crown gear of said at least one wheel, said first mounting point being situated above said second pivot point of said at least one swinging arm, and a second complementary transfer pinion arranged between said at least one wheel and said one of said power pinion and said engine drive shaft pinion, said second transfer pinion being rotationally mounted at a second mounting point on said frame below said second pivot point of said at least one swinging arm, said at least one chain further comprising a second chain for operatively connecting said one of said driven pinion and said crown gear and said one of said power pinion and said engine drive shaft pinion such that a first portion of said second chain between said second transfer pinion and said one of said driven pinion and said crown gear and a second portion of said first chain between said one of said guide pinion and said pulley and said one of said driven pinion and said crown gear are substantially parallel to each other and to said at least one swinging arm, said at least one wheel being a rear wheel of the vehicle and said wheel opposite said at least one wheel being a front wheel of the vehicle, said first and second portions of said second chain being substantially parallel to the line extending from the point of tangency of said rear wheel with the ground to the high point defined by the intersection of the line which runs perpendicular to the ground through the point of tangency with the ground of said front wheel and the line extending substantially parallel to the ground through the center of gravity of the vehicle at the height of the center of gravity of the vehicle and rider assembly in the position of positive acceleration in the horizontal direction.

4. The mechanism of claim 1, wherein said second pivot point of said at least one swinging arm is situated close to the center of gravity of the vehicle and rider assembly in the position of positive and negative acceleration in the horizontal direction at a distance from the center of gravity which is less than a maximum dimension of a crankcase of the vehicle.

5. The mechanism of claim 1, further comprising an intermediate piece arranged between said at least one swinging arm and said frame for connecting said at least one swinging arm to said frame, said intermediate piece being structured and arranged to pivot about said second pivot point and slide relative to said frame, and elastic means arranged between said frame and said intermediate piece.

6. The mechanism of claim 1, further comprising a support coupled to said frame and rotatable about said second pivot point, said transfer pinion being mounted on said support.

7. The mechanism of claim 5, wherein said intermediate piece comprises at least one axis which slides within a corresponding housing provided in said frame.

8. The mechanism of claim 5, wherein said intermediate piece comprises at least one housing inside which slides a corresponding axis which forms an integral part of said frame.

9. The mechanism of claim 6, further comprising an intermediate piece arranged between said at least one swinging arm and said frame for connecting said at least one swinging arm to said frame, said intermediate piece being structured and arranged to pivot about said second pivot point and slide relative to said frame, and elastic means arranged between said intermediate piece and said support on which said transfer pinion is mounted.

10. The mechanism of claim 5, wherein said intermediate piece is coupled to a fuel tank of the vehicle.

11. The mechanism of claim 6, further comprising elastic means arranged between said frame and said support on which said transfer pinion is mounted.

12. The mechanism of claim 1, further comprising a first suspended structure which support an engine, and a second suspended structure which constitutes a rider's grip support, said first and second structure being pivotable about said second pivot point, said at least one swinging arm constituting a third structure pivotable about said second pivot point.

13. The mechanism of claim 12, wherein the engine is mounted in said first suspended structure such that a crankcase of the engine is arranged above a cylinder of the engine.

14. The mechanism of claim 12, wherein the engine is mounted in said first suspended structure such that said one of said power pinion and said engine drive shaft pinion is arranged close to said second pivot point of said at least one of swinging arm at a distance which is less than a maximum dimension of a crankcase of the engine.

15. The mechanism of claim 1, wherein a brake disk of the vehicle is mounted directly onto an axis of said transfer pinion.

16. The mechanism of claim 3, wherein said guide member comprises a guide pinion or a guide pulley.

17. The mechanism of claim 1, wherein said at least one swinging arm is substantially rigid and inelastic.

18. A suspension/transmission mechanism for motorcycles and other vehicles having at least one wheel and a motor output, comprising a frame, at least one elongate swinging arm for coupling said at least one wheel to said frame, said at least one swinging arm being structured and arranged to pivot at a first pivot point at one end on at least one side of said at least one wheel and at a second pivot point at the other end on said frame, said at least one swinging arm being arranged such that a virtual line joining said first and second pivot points is substantially parallel to a line extending from a point of tangency of said at least one wheel with the ground to a high point defined by the intersection of a line which runs perpendicular to the ground through the point of tangency with the ground of a wheel opposite said at least one wheel and a line extending substantially parallel to the ground at the height of the center of gravity of the vehicle and rider assembly in a position of positive and negative acceleration, one of a power pinion and an engine drive shaft pinion coupled to the motor output, one of a driven pinion and a crown gear arranged on a shaft of said at least one wheel, at least one chain for motively coupling said one of said power pinion and said engine drive shaft pinion to said one of said driven pinion and said crown gear, a complementary transfer pinion arranged between said one of said power pinion and said engine drive shaft pinion and said one of said driven pinion and said crown gear, a guide member arranged between said one of said power pinion and said engine drive shaft pinion and said one of said driven pinion and said crown gear and rotationally mounted at said second pivot point, said guide member having a diameter equal to a diameter of said one of said driven pinion and said crown gear, said at least one wheel being a rear wheel of the vehicle, said one of said driven pinion and said crown gear forming an integral part of said rear wheel, said at least one chain comprising a first chain for operatively connecting said one of said driven pinion and said crown gear and said guide member such that portions of said first chain between said one of said driven pinion and said crown gear and said guide member are substantially parallel to each other and to said at least one swinging arm, a support coupled to said frame and rotatable about said second pivot point, said transfer pinion being mounted on said support, an intermediate piece arranged between said at least one swinging arm and said frame for connecting said at least one swinging arm to said frame, said intermediate piece being structured and arranged to pivot about said second pivot point and slide relative to said frame, and elastic means arranged between said intermediate piece and said support on which said transfer pinion is mounted.

19. A suspension/transmission mechanism for motorcycles and other vehicles having at least one wheel and a motor output, comprising a frame, at least one swinging arm for coupling said at least one wheel to said frame, said at least one swinging arm being structured and arranged to pivot at a first pivot point at one end on at least one side of said at least one wheel and at a second pivot point at the other end on said frame, said at least one swinging arm being arranged such that a virtual line joining said first and second pivot points is substantially parallel to a line extending from a point of tangency of said at least one wheel with the ground to a high point defined by the intersection of a line which runs perpendicular to the ground through the point of tangency with the ground of a wheel opposite said at least one wheel and a line extending substantially parallel to the ground at the height of the center of gravity of the vehicle and rider assembly in a position of positive and negative acceleration, one of a power pinion and an engine drive shaft pinion coupled to the motor output, one of a driven pinion and a crown gear arranged on a shaft of said at least one wheel, at least one chain for motively coupling said one of said power pinion and said engine drive shaft pinion to said one of said driven pinion and said crown gear, an intermediate piece arranged between said at least one swinging arm and said frame for connecting said at least one swinging arm to said frame, said intermediate piece being structured and arranged to pivot about said second pivot point and slide relative to said frame, said intermediate piece being coupled to a fuel tank of the vehicle, and elastic means arranged between said frame and said intermediate piece.

* * * * *